US012747937B2

(12) United States Patent
Quade

(10) Patent No.: US 12,747,937 B2
(45) Date of Patent: Sep. 29, 2026

(54) BICYCLE CHAIN WEAR MEASURING TOOLS

(71) Applicant: ABBEY BIKE TOOLS, Bend, OR (US)

(72) Inventor: Jason C. Quade, Bend, OR (US)

(73) Assignee: ABBEY BIKE TOOLS, Bend, OR (US)

( * ) Notice: Subject to any disclaimer, the term of this patent is extended or adjusted under 35 U.S.C. 154(b) by 405 days.

(21) Appl. No.: 18/390,763

(22) Filed: Dec. 20, 2023

(65) Prior Publication Data

US 2025/0207901 A1 Jun. 26, 2025

(51) Int. Cl.
*G01B 5/00* (2006.01)

(52) U.S. Cl.
CPC ............ *G01B 5/0025* (2013.01); *G01B 5/003* (2013.01)

(58) Field of Classification Search
CPC ..... B62J 1/08; B62J 11/22; B62J 31/00; B62J 99/00; B60S 3/041; G01L 5/06; G01L 5/047; G01L 5/10; G01L 5/102; G01L 5/103; F16G 13/02; G01B 5/0025; G01B 5/003
USPC ............................................... 73/828; 33/549
See application file for complete search history.

(56) References Cited

U.S. PATENT DOCUMENTS 4,036,069 A * 7/1977 Clark ....................... B62M 9/16 474/135
4,092,781 A * 6/1978 Blake ....................... G01B 3/46 33/501.4
4,365,420 A * 12/1982 Walden .................. G01B 5/025 33/679.1
4,672,751 A * 6/1987 Jones ....................... G01B 5/25 33/286
4,858,266 A * 8/1989 Engstrom ................ B62J 31/00 15/236.08
4,888,876 A * 12/1989 Meredith ................ G01B 3/30 33/555.1

(Continued)

FOREIGN PATENT DOCUMENTS

CN 217358367 U * 9/2022

OTHER PUBLICATIONS

Performance Bicycle, Abbey Bike Tools LL Chain Wear Tool (Green), Nov. 6, 2024, https://www.performancebike.com/abbey-bike-tools-II-chain-wear-tool-green-chn-std-wrplt/p1568209?msclkid=205424898ce8a12f0b39e4d267dfc5287&utm_source=bing&utm_medium=cpc&utm_campaign=PB-MS-SHP-U-SAL-MIX-tROAS-All%20Inventory%20(100-.*

(Continued)

*Primary Examiner* — Peter J Macchiarolo
*Assistant Examiner* — Anna Josephine Saunders
(74) *Attorney, Agent, or Firm* — Leber IP Law; Celia H. Leber

(57) ABSTRACT

A device for measuring lateral wear of a bicycle chain includes (a) an elongated rigid plate configured to be grasped in a user's hand, the elongated plate having a first planar broad surface, a long axis and a short axis; (b) a lateral boss extending outwardly from the first planar broad surface adjacent a corner of the plate, the lateral boss configured to support a portion of the chain with the chain extending in the direction of the long axis; and (c) a lateral wear measurement scale disposed on the first planar broad surface at an end of the plate opposite to the corner, the measurement scale extending in the direction of the short axis. In some implementations the device can also be used to measure longitudinal wear of the chain.

18 Claims, 9 Drawing Sheets

(56) References Cited

U.S. PATENT DOCUMENTS

| | | | | | |
|---|---|---|---|---|---|
| 5,003,913 | A * | 4/1991 | Jensen | G01B 5/16 | 116/200 |
| 5,251,341 | A * | 10/1993 | Seals | B25B 27/22 | 74/551.8 |
| 8,136,338 | B2 * | 3/2012 | Huang | B25B 27/22 | 7/138 |
| 9,513,099 | B2 * | 12/2016 | Hoebel | G01B 5/02 | |
| 2009/0193907 | A1 * | 8/2009 | Wilbur | G01N 3/56 | 73/829 |
| 2011/0034280 | A1 * | 2/2011 | Kang | F16H 7/24 | 474/116 |
| 2025/0207901 | A1 * | 6/2025 | Quade | G01B 5/0025 | |

OTHER PUBLICATIONS

"Chain Wear Measuring Tools", pardo.net/bike/pic/fail-004/000.html#speedtech, retreived on line Dec. 19, 2023, 10 pages.

"Chain Wear Indicator", Speedtech, https://www.ebay.com/itm/124645390485?chn=ps&norover=1&mkevt=1&mkrid=711-213727-13078-0&mkcid=2&itemid=124645390485&targetid=4581183931512190&device=c&mktype=&googleloc=&poi=&campaignid=603247656&mkgroupid=1241349622402367&rlsatarget=pla-4581183931512190&abcld=9316139&merchantid=51291&msclkid=1c8874a37e8e12deb6a711dbd5ea0d45, retrieved on line Dec. 19, 2023, 3 pages.

* cited by examiner

BICYCLE CHAIN WEAR MEASURING TOOLS

BACKGROUND

Bicycle chains wear both along their length (elongation of the chain, referred to herein as longitudinal wear) and along the faces of the rollers (lateral wear). Lateral wear, also referred to as "slop," is common with riders who do not put a lot of torque into their drivetrain and/or spin a higher cadence.

Lateral wear causes side-to-side play in the chain. As a result, shifting is compromised because the shifting ramps of the cassette or chainring need to work harder to derail the chain onto the desired cog.

Both longitudinal and lateral wear can cause problems with shifting gears, and longitudinal wear can negatively impact the life of the drive train of the bicycle by accelerating wear of the gear sprockets due to chain slippage. Thus, it is desirable to be able to easily check for chain wear in order to diagnose shifting issues and prevent damage to the drive train of the bicycle.

While devices are available for checking the degree of longitudinal wear of a chain, lateral chain wear, also referred to as "slop" or side-to-side play in the chain, is less recognized as an issue and few if any devices are available to check for it. Moreover, some devices used to measure longitudinal wear are calibrated for chains having a given roller diameter and will not work with chains having a different roller diameter.

SUMMARY

The present disclosure features bicycle chain wear measuring tools. The tools provide an easy and effective way of measuring lateral wear of a bicycle chain. In some implementations the devices and methods can also be used to measure longitudinal wear.

In one aspect, the disclosure features a device for measuring lateral wear of a bicycle chain having a plurality of links that include rollers, alternating pairs of inner plates and outer plates, and pins extending through the rollers and apertures in the plates. The device includes (a) an elongated rigid plate configured to be grasped in a user's hand, the elongated plate having a first planar broad surface, a long axis and a short axis; (b) a lateral boss extending outwardly from the first planar broad surface adjacent a corner of the plate, the lateral boss configured to support a portion of the chain with at least one of the outer plates lying flat against a surface of the lateral boss and the chain extending in the direction of the long axis; and (c) a lateral wear measurement scale disposed on the first planar broad surface at an end of the plate opposite to the corner, the measurement scale extending in the direction of the short axis.

Some implementations include one or more of the following features. The lateral boss has a depth greater than or equal to a width of the outer plate of the chain. The lateral boss has a length greater than or equal to a length of the outer plate of the chain. The lateral wear measurement scale comprises a plurality of depressions in the plate. The lateral wear measurement scale further comprises a plurality of indicia positioned adjacent corresponding depressions. The plate comprises a machined aluminum plate, and the lateral boss is integrally machined with the plate.

In some implementations the device can also be used to measure longitudinal wear of the chain. In such implementations the device further includes a chain prong configured to support one of the rollers of the chain extending from the first broad planar surface and a longitudinal wear measurement scale disposed on a second broad planar surface of the plate opposite to the first broad planar surface. The chain prong may be disposed adjacent the lateral boss and the longitudinal measurement scale disposed adjacent to the lateral wear measurement scale. The longitudinal measurement scale comprises a plurality of through holes extending through the plate, the through holes arranged in the direction of the short axis. In some cases the through holes are surrounded by a recess in the plate, the recess being disposed on the second broad planar surface of the plate. The longitudinal measurement scale may further include indicia indicative of the percentage of longitudinal wear.

In some implementations the chain prong comprises a lateral spacer element and a prong body having a pair of teeth, each tooth configured to fit between adjacent rollers on the chain to accurately locate the roller center, and an arcuate surface between the teeth configured to conform to a surface of the roller. The device may also include a bore in the plate positioned adjacent the arcuate surface and serving as a datum for measurement when a roller is in place on the chain prong.

In another aspect, the invention features a device for measuring longitudinal wear of a bicycle chain having a plurality of links that include rollers, alternating pairs of inner plates and outer plates, and pins extending through the rollers and apertures in the plates, the device comprising (a) an elongated rigid plate configured to be grasped in a user's hand, the elongated plate having a first planar broad surface, a long axis and a short axis; (b) a chain prong configured to support one of the rollers of the chain extending from the first broad planar surface; and (c) a quantitative longitudinal wear measurement scale disposed on a second broad planar surface of the plate opposite to the first broad planar surface.

Some implementations of this aspect may include any of the features discussed above, individually or in combination.

In yet another aspect, the disclosure features a method of measuring wear of a bicycle chain. The method includes (1) providing a chain wear measurement device comprising (a) an elongated rigid plate configured to be grasped in a user's hand, the elongated plate having a first planar broad surface, a long axis and a short axis; (b) a lateral boss extending outwardly from the first planar broad surface adjacent a corner of the plate, the lateral boss configured to support a portion of the chain; and (c) a lateral wear measurement scale disposed on the first planar broad surface at an end of the plate opposite to the corner, the measurement scale extending in the direction of the short axis; (2) positioning a bicycle chain on the device with at least one of the outer plates lying flat against a surface of the lateral boss and the chain extending in the direction of the long axis; and (3) observing the position of the chain relative to the lateral wear measurement scale to determine the degree of lateral wear.

In some implementations the method further includes using the chain wear measurement device to measure longitudinal wear of the chain, for example by placing a roller of the chain in a chain prong of the device and observing the position of the chain relative to a longitudinal measurement scale at an end of the plate opposite to an end at which the chain prong is positioned.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DETAILED DESCRIPTION

Figure 1:
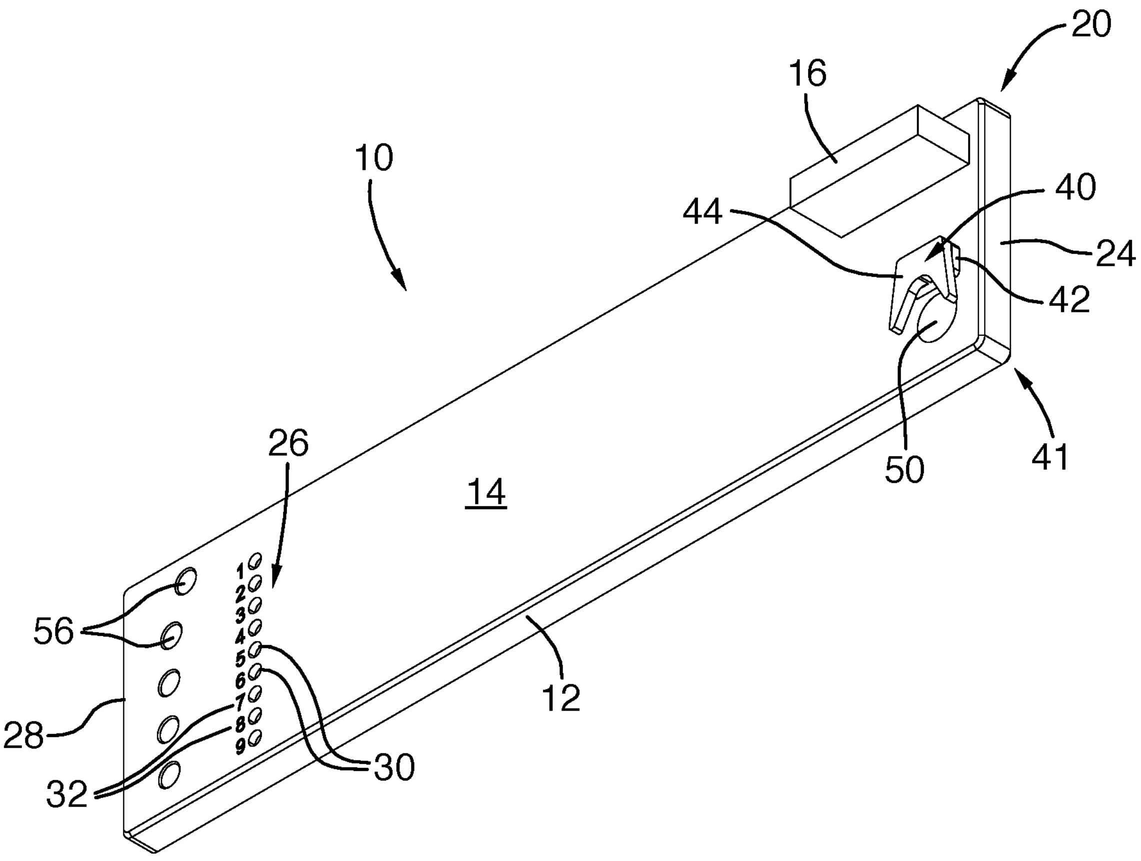
FIG. 1 is a perspective view of a bicycle chain wear measuring device according to one implementation.
Figure 4:
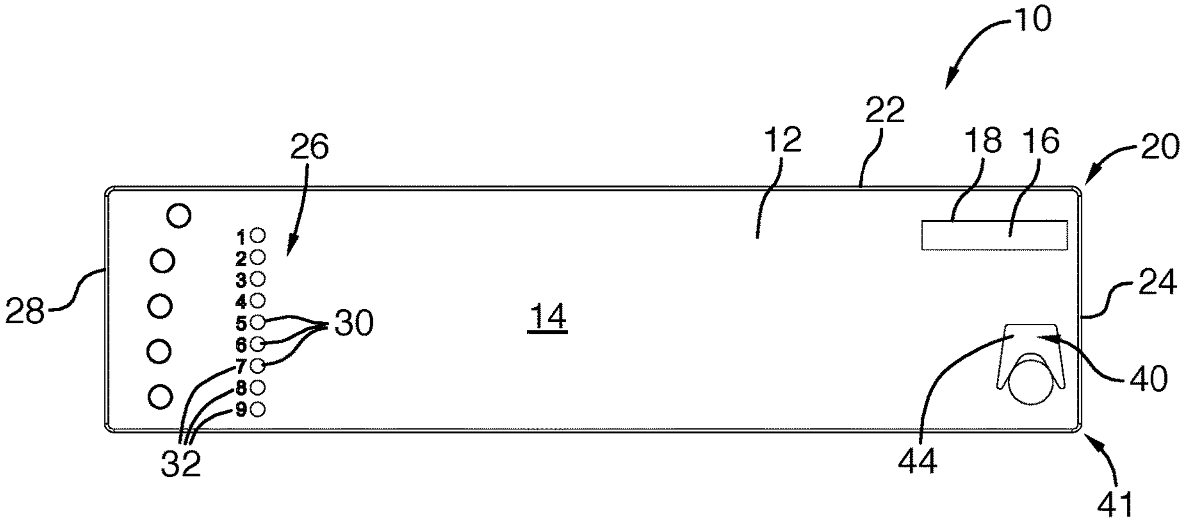
FIG. 4 is a rear plan view of the device.
Figure 5:
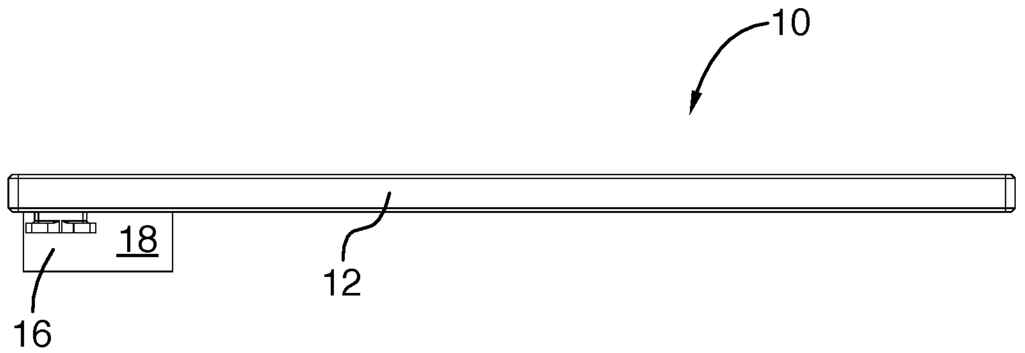
FIG. 5 is a bottom view of the device.

Referring to FIGS. 1 and 4, a device 10 for measuring chain wear includes a plate 12 having a first broad planar surface 14. In some preferred implementations the plate 12 is metal, e.g., a machined aluminum plate, for consistent precision of measurements over time and overall durability of the device. In other implementations the plate can be a molded plastic plate. If plastic is used it may be desirable for the plate to have a thickness of from about 3 to 10 mm to provide the device with good durability in the harsh environment of a bike shop and to impart rigidity to the plate. Regardless of the material the plate should have sufficient rigidity so that it will not flex during use.

Figure 7:
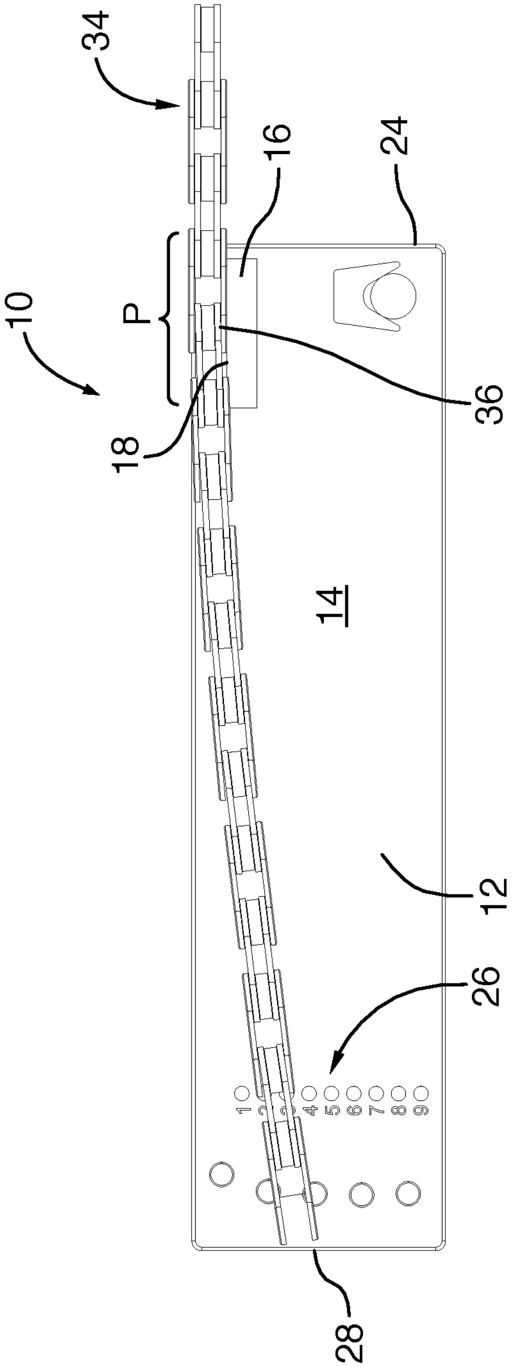
FIG. 7 is a diagrammatic view of the device in use measuring lateral wear of a chain exhibiting minimal wear.

A lateral boss 16 extends outwardly from the surface 14 and includes a planar top surface 18. The lateral boss 16 is positioned adjacent a corner 20 of the plate 12 and is spaced from long edge 22 of the plate 12 by a distance approximately equal to the width (pin length) of the chain, as can be seen in FIG. 7. The lateral boss is positioned close to the short edge 24 of the plate, e.g., 0 to 5 mm from the edge 24. In some preferred implementations the lateral boss is integrally molded with the plate. A lateral wear measurement scale 26 is positioned near to the opposite short edge 28 of the plate. Lateral measurement scale 26 includes a column of recesses 30 and a plurality of corresponding indicia 32 (numbers in the embodiment shown) aligned with the recesses.

Figure 8:
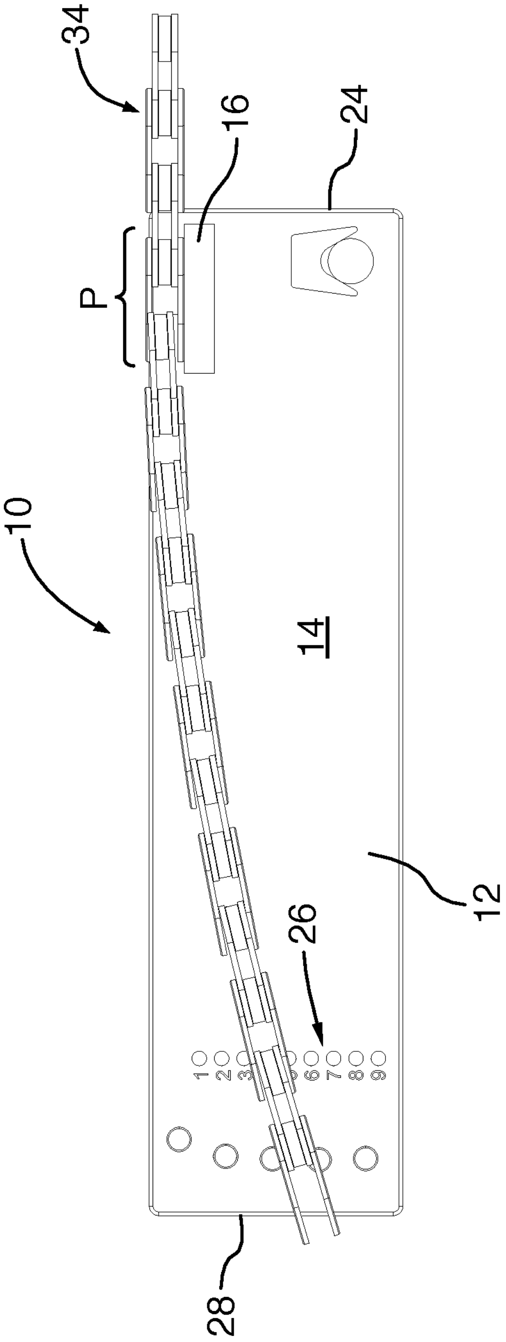
FIG. 8 is a diagrammatic view of the device in use measuring lateral wear of a chain exhibiting moderate wear.

These features are used to measure lateral wear of the chain as illustrated in FIGS. 7 and 8. The chain 34 to be evaluated is first removed from the bicycle. Next, holding the device 10 such that surface 14 is vertical, a portion P of the chain is placed on the surface 18 of the lateral boss 16 with the outer plate(s) 36 of the chain in that portion lying flat against surface 18 and a length of the chain extending toward edge 28 of the plate 12 (to the left in FIG. 7). When positioned in this manner, a chain with no significant lateral wear will bend a small amount from horizontal as shown in FIG. 7. However, a chain that is worn laterally will arc downwards further on the lateral wear measurement scale under the force of gravity, as shown in FIG. 8. The degree of lateral wear can be determined by observing which indicia is the indicia immediately underneath the lower edge of the chain, i.e., "6" in the example shown in FIG. 8. The higher the number, the greater the degree of lateral chain wear.

Device 10 also includes features that allow it to be used to measure longitudinal wear. Referring again to FIGS. 1 and 4, a chain prong 40 extends outwardly from surface 14 adjacent to the lateral boss 16. The chain prong is positioned near to corner 41 so that it does not interfere with measurement of lateral wear and the lateral boss does not interfere with measurement of longitudinal wear (e.g., by either element hindering the movement of the chain if it were placed in the path of the chain). Positioning the chain prong on the same side of the plate 12 as the lateral boss allows the measurement scales for lateral and longitudinal wear to be on opposite sides of the plate 12 for clarity. Having the two protruding features on one side of the plate also allows the device to lay flat on a surface when not in use and makes the device easier to package, ship, and store.

Figure 6:
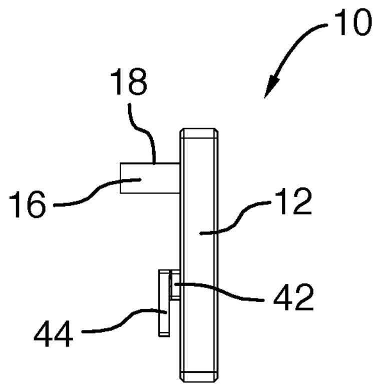
FIG. 6 is a side view of the device.
Figure 9:
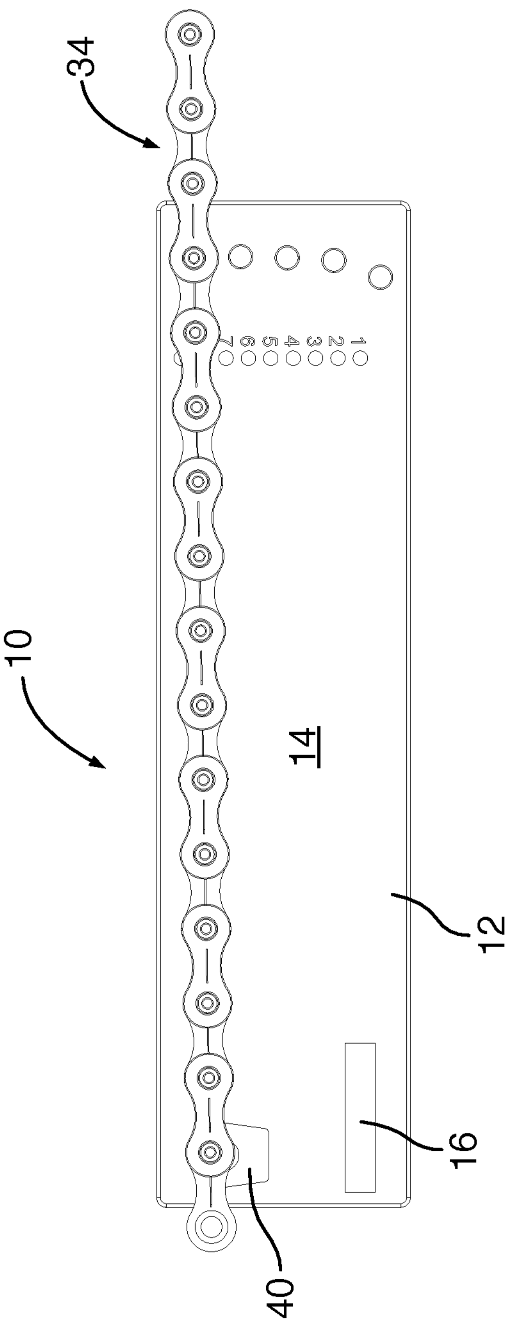
FIG. 9 is a diagrammatic view taken from the back of the device of the device in use measuring longitudinal wear of a chain exhibiting 0.3% wear.
Figure 10:
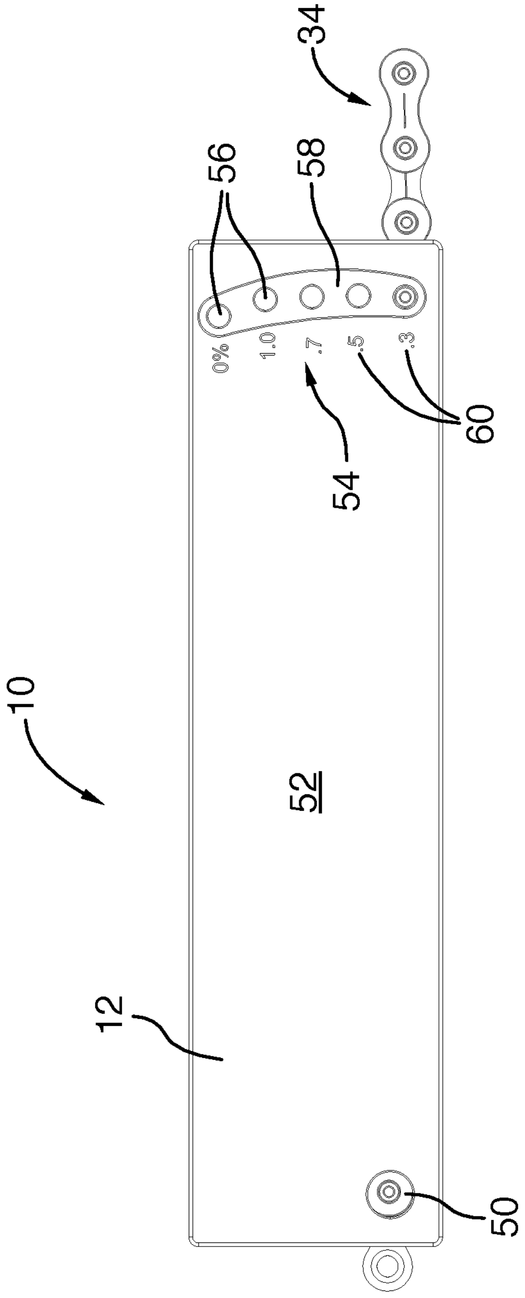
FIG. 10 is a diagrammatic view taken from the front of the device in use as shown in FIG. 9.

As can be seen in FIG. 6, the chain prong 40 includes a spacer 42 and a prong body 44 that is spaced slightly (e.g., 0.5 to 5 mm) from surface 14 by the spacer 42. Referring to FIG. 4, the prong body 44 includes a pair of teeth 46 and an arcuate surface 48 between the teeth. The teeth 46 are configured to fit between adjacent rollers of the chain and the arcuate surface 48 is shaped to conform to an outer surface of a roller, thus allowing the prong body to grip a roller as shown in FIG. 9. A bore 50 is provided above the arcuate surface 48, as shown in FIG. 1, as a datum for measurement, as will be discussed below, and to allow a user to see the pin of the roller as shown in FIG. 10 and thereby ensure correct positioning of the chain. Like the lateral boss, in preferred embodiments the chain prong 40 is integrally molded with the plate 12.

Figure 2:
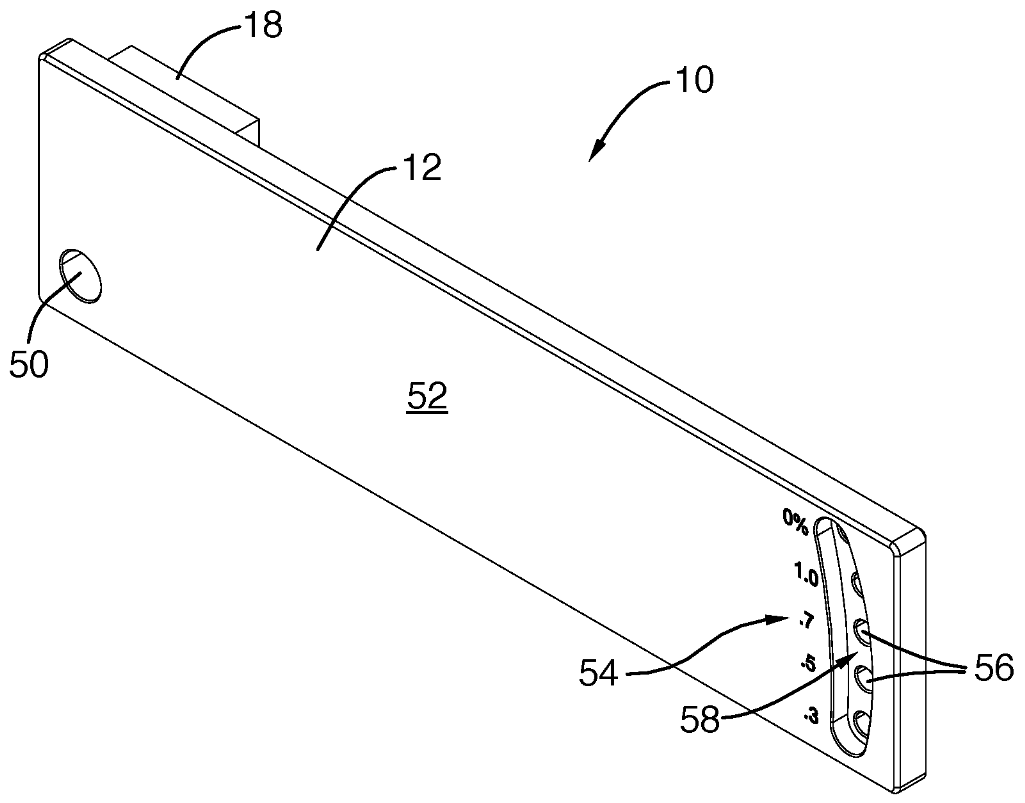
FIG. 2 is a perspective view of the device shown in FIG. 1 taken from the opposite side.
Figure 3:
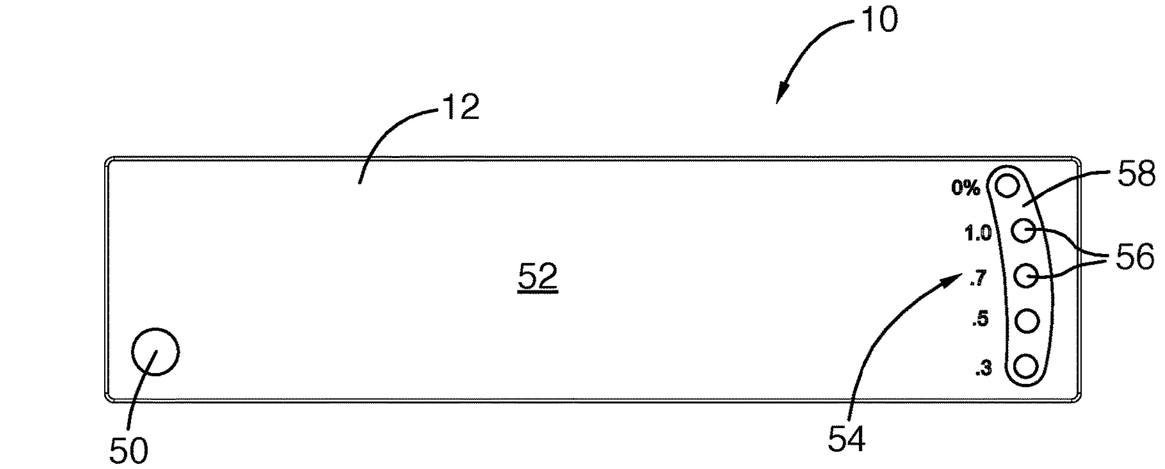
FIG. 3 is a front plan view of the device.

Referring now to FIGS. 2 and 3, the opposite broad, planar face 52 of the plate 12 includes a longitudinal wear measurement scale 54. Scale 54 includes a number of through holes 56 positioned within a recessed area 58. Scale 54 also includes indicia 60 that are positioned adjacent to corresponding through holes. In the example shown, the indicia are 0%, 1.0, 0.7, 0.5 and 0.3, indicating percentage of increase in length. Chain wear is typically measured as a percentage of increase in length, with 1% chain wear indicating a large amount of wear and 0.5% being considered by some to be the optimal time for replacement to prevent drive train damage. The longitudinal wear measurement scale 54 quantifies the percentage of stretch so the user can accurately determine, according to this percentage system, how much wear is present. Different chains should be replaced at different wear levels and users may choose to replace their chain at different wear levels based on the recommendation for a given chain, so this quantitative measurement is an improvement over known "go-no go" chain wear measurement tools which merely provide a qualitative indication of excessive wear.

To create the longitudinal wear measurement scale 54, the percentages of wear indicated by the indicia 60 were converted from a percentage to a linear measurement that uses bore 50 as a datum for the measurement. The linear difference between 0.5 percent and 1 percent of wear is rather small, 0.030" when measured over 6" of chain. This means the precision of the tool is important to obtaining an accurate end result.

Figure 11:
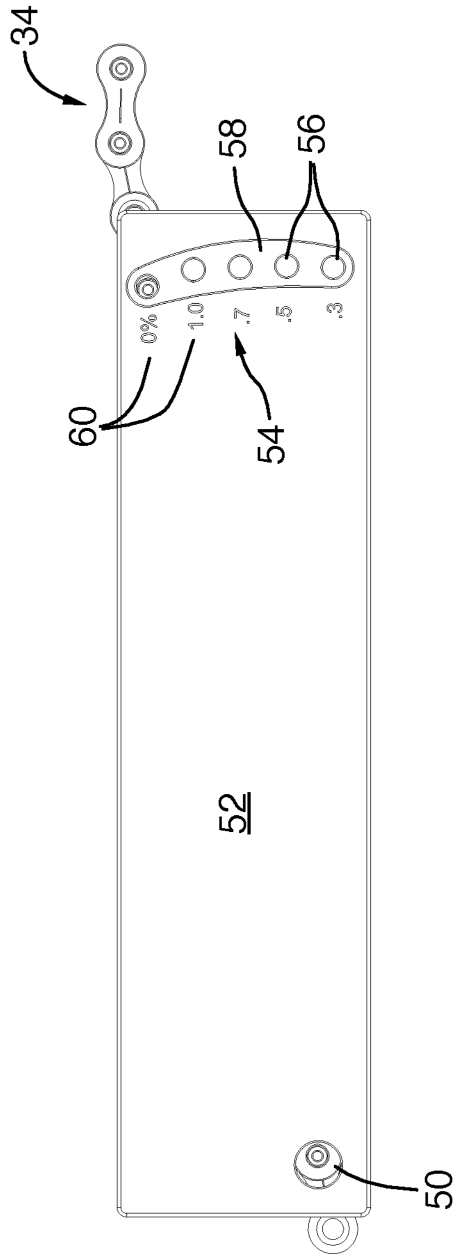
FIG. 11 is a diagrammatic view of the device in use measuring longitudinal wear of a chain exhibiting very little wear.

Use of the device 10 to measure longitudinal wear is illustrated in FIGS. 9-11. Referring to FIG. 9, the chain 34 is first positioned on the device by inserting the prong body of the chain prong 40 around one of the rollers of the chain. In this case, the chain is positioned with its outer plates touching the surface 14. The two teeth 46 of the chain prong 40 accurately locate the center of the pin on the bore 50, ensuring an accurate measurement. As in the lateral wear test, the plate 12 is held such that the surface 14 is vertical. In this test, the chain may remain attached to the bicycle or can be removed. To determine the degree of wear, the user rotates the plate 12, with surface 52 facing the user, as shown in FIGS. 10 and 11, until a pin of the chain lines up with one of the through holes 56. The recessed area 58 facilitates viewing through the through holes 56 by reducing the thickness of plate 12 in the recessed area. In the example shown in FIG. 10, the chain is exhibiting 0.3% longitudinal wear, whereas in the example shown in FIG. 11 the chain is exhibiting a lesser amount of longitudinal wear.

Advantageously, both the lateral measurement scale and the longitudinal measurement scale are relatively precise, providing the user with an accurate assessment of the degree of chain wear to help the user determine whether the chain should be replaced. The tool is easy to use, can be used with any chain (regardless of roller diameter), and can withstand harsh use conditions.

OTHER EMBODIMENTS

A number of embodiments have been described. Nevertheless, it will be understood that various modifications may be made without departing from the spirit and scope of the disclosure.

For example, while the device described above advantageously can be used to check both lateral and longitudinal wear, in some implementations the features for checking longitudinal wear can be omitted.

Moreover, while numbers are shown as the indicia 32, letters or other indicia associated with a scale of wear can be used instead of numbers.

Additionally, the recess surrounding the openings of the longitudinal wear measurement scale can be omitted if the thickness of plate 12 is reduced. However, depending on the materials used this may lead to the device having reduced durability.

Also, in other implementations lateral wear can be measured by placing a known force on the chain and checking for wear with the chain sitting vertically, rather than using gravity to deflect the chain as in the implementation discussed above.

Accordingly, other embodiments are within the scope of the following claims.

What is claimed is:

1. A device for measuring lateral wear of a bicycle chain having a plurality of links that include rollers, alternating pairs of inner plates and outer plates, and pins extending through the rollers and apertures in the plates, the device comprising:

an elongated rigid plate configured to be grasped in a user's hand, the elongated plate having a first planar broad surface, a long axis and a short axis;

a lateral boss extending outwardly from the first planar broad surface adjacent a corner of the plate, the lateral boss configured to support a portion of the chain with the chain extending in the direction of the long axis and at least one of the outer plates lying flat against a surface of the lateral boss, the surface having a depth greater than or equal to a width of the outer plate of the chain and a length greater than or equal to a length of the outer plate of the chain; and a lateral wear measurement scale disposed on the first planar broad surface at an end of the plate opposite to the corner, the measurement scale extending in the direction of the short axis.

2. The device of claim 1 wherein the lateral wear measurement scale comprises a plurality of depressions in the plate.

3. The device of claim 2 wherein the lateral wear measurement scale further comprises a plurality of indicia positioned adjacent corresponding depressions.

4. The device of claim 1 wherein the plate comprises a machined aluminum plate.

5. The device of claim 4 wherein the lateral boss is integrally machined with the plate.

6. The device of claim 1 further comprising a chain prong configured to support one of the rollers of the chain extending from the first broad planar surface and a longitudinal wear measurement scale disposed on a second broad planar surface of the plate opposite to the first broad planar surface.

7. The device of claim 6 wherein the chain prong is disposed adjacent the lateral boss and the longitudinal measurement scale is disposed adjacent to the lateral wear measurement scale.

8. The device of claim 6 wherein the longitudinal measurement scale comprises a plurality of through holes extending through the plate, the through holes arranged in the direction of the short axis.

9. The device of claim 8 wherein the through holes are surrounded by a recess in the plate, the recess being disposed on the second broad planar surface of the plate.

10. The device of claim 9 wherein the longitudinal measurement scale further includes indicia indicative of the percentage of longitudinal wear.

11. The device of claim 6 wherein the chain prong comprises a lateral spacer element and a prong body having a pair of teeth, each tooth configured to fit between adjacent rollers on the chain to accurately locate the roller center, and an arcuate surface between the teeth configured to conform to a surface of the roller.

12. The device of claim 11 further comprising a bore in the plate positioned adjacent the arcuate surface and serving as a datum for measurement when a roller is in place on the chain prong.

13. The device of claim 11 wherein the chain prong is positioned so that the teeth face away from the lateral boss.

14. The device of claim 6 wherein the chain prong is integrally machined with the plate.

15. A device for measuring longitudinal wear of a bicycle chain having a plurality of links that include rollers, alternating pairs of inner plates and outer plates, and pins extending through the rollers and apertures in the plates, the device comprising:

an elongated rigid plate configured to be grasped in a user's hand, the elongated plate having a first planar broad surface, the plate having a first short end and a second short end, a long axis and a short axis;

a chain prong configured to support one of the rollers of the chain extending from the first broad planar surface at the first short end of the plate;

a quantitative longitudinal wear measurement scale disposed on a second broad planar surface of the plate opposite to the first broad planar surface at the second short end of the plate;

a lateral boss extending outwardly from the first planar broad surface at the first short end of the plate, the lateral boss configured to support a portion of the chain with the chain extending in the direction of the long axis and at least one of the outer plates lying flat against a surface of the lateral boss, the surface being configured to support the at least one outer plate of the chain; and a lateral wear measurement scale disposed on the first planar broad surface at the second short end of the plate, the measurement scale extending in the direction of the short axis.

16. A method of measuring wear of a bicycle chain, the method comprising:

providing a chain wear measurement device comprising (a) an elongated rigid plate configured to be grasped in a user's hand, the elongated plate having a first planar broad surface, a long axis and a short axis; (b) a lateral boss extending outwardly from the first planar broad surface adjacent a corner of the plate, the lateral boss configured to support a portion of the chain, the chain extending in the direction of the long axis and at least one of the outer plates lying flat against a surface of the lateral boss, the surface having a depth greater than or equal to a width of the outer plate of the chain and a length greater than or equal to a length of the outer plate of the chain; and (c) a lateral wear measurement scale disposed on the first planar broad surface at an end of the plate opposite to the corner, the measurement scale extending in the direction of the short axis;

positioning a bicycle chain on the device with at least one of the outer plates lying flat against the surface of the lateral boss and the chain extending in the direction of the long axis; and observing the position of the chain relative to the lateral wear measurement scale to determine the degree of lateral wear.

17. The method of claim 16 further comprising using the chain wear measurement device to measure longitudinal wear of the chain.

18. The method of claim 17 comprising placing a roller of the chain in a chain prong of the device and observing the position of the chain relative to a longitudinal measurement scale at an end of the plate opposite to an end at which the chain prong is positioned.

* * * * *